United States Patent
Cabillic et al.

(10) Patent No.: US 10,216,497 B2
(45) Date of Patent: *Feb. 26, 2019

(54) SELECTIVE COMPILING METHOD, DEVICE, AND CORRESPONDING COMPUTER PROGRAM PRODUCT

(71) Applicant: Google LLC, Mountain View, CA (US)

(72) Inventors: Gilbert Cabillic, Brece (FR); Jean-Philippe Lesot, Argentre du Plessis (FR)

(73) Assignee: Google LLC, Mountain View, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 15/359,478

(22) Filed: Nov. 22, 2016

(65) Prior Publication Data

US 2017/0075667 A1 Mar. 16, 2017

Related U.S. Application Data (63) Continuation of application No. 13/807,398, filed as application No. PCT/EP2011/060748 on Jun. 27, 2011, now Pat. No. 9,535,672.

(30) Foreign Application Priority Data

Jun. 29, 2010 (FR) .................................. 10 55261

(51) Int. Cl.
*G06F 8/41* (2018.01)
*G06F 8/52* (2018.01)
*G06F 9/455* (2018.01)

(52) U.S. Cl.
CPC ............. *G06F 8/443* (2013.01); *G06F 8/41* (2013.01); *G06F 8/52* (2013.01); *G06F 9/45516* (2013.01)

(58) Field of Classification Search
None
See application file for complete search history.

(56) References Cited

U.S. PATENT DOCUMENTS

| | | | |
|---|---|---|---|
| 653,156 | A | 7/1900 | Toxey |
| 3,859,636 | A | 1/1975 | Cook |
| 5,101,342 | A | 3/1992 | Namimoto |
| 5,598,575 | A | 1/1997 | Dent |

(Continued)

FOREIGN PATENT DOCUMENTS

WO 03032155 A2 4/2003

OTHER PUBLICATIONS

International Search Report dated Aug. 5, 2011 for corresponding International Application No. PCT/EP2011/060748, filed Jun. 27, 2011.

(Continued)

*Primary Examiner* — Jason D Mitchell
(74) *Attorney, Agent, or Firm* — McDonnell Boehnen Hulbert & Berghoff LLP (57) ABSTRACT

A method and compiling device are provided for compiling a software application to be executed on a virtual machine of a physical platform. The software application originally is in the form of a set of codes to be compiled. The method includes a phase of selectively compiling the set of codes to be compiled, outputting a compiled application including a first application part which is executed by the virtual machine using commands from the virtual machine, and a second application part including binary commands which can be executed directly on the physical platform.

20 Claims, 3 Drawing Sheets

(56) References Cited

U.S. PATENT DOCUMENTS

| | | | |
|---|---|---|---|
| 5,854,935 | A | 12/1998 | Enomoto |
| 6,141,732 | A | 10/2000 | Adams |
| 6,163,836 | A | 12/2000 | Dowling |
| 6,253,215 | B1 | 6/2001 | Agesen et al. |
| 6,289,506 | B1 | 9/2001 | Kwong et al. |
| 6,295,642 | B1 | 9/2001 | Blandy |
| 6,295,643 | B1 | 9/2001 | Brown et al. |
| 6,321,323 | B1 | 11/2001 | Nugroho |
| 6,484,188 | B1 | 11/2002 | Kwong et al. |
| 6,629,113 | B1 | 9/2003 | Lawrence |
| 6,754,828 | B1 | 6/2004 | Marisetty |
| 6,823,505 | B1 | 11/2004 | Nugroho |
| 6,851,109 | B1 | 2/2005 | Alexander et al. |
| 7,150,012 | B2 | 12/2006 | Hill |
| 7,213,240 | B2 | 5/2007 | Wong et al. |
| 7,489,946 | B2 | 2/2009 | Srinivasan |
| 7,788,657 | B2 | 8/2010 | Wannamaker et al. |
| 2002/0029357 | A1 | 3/2002 | Charnell et al. |
| 2002/0046298 | A1 | 4/2002 | Bak et al. |
| 2003/0070161 | A1 | 4/2003 | Wong et al. |
| 2003/0079213 | A1 | 4/2003 | Cabillic |
| 2004/0098724 | A1 | 5/2004 | Demsey |
| 2004/0243989 | A1 | 12/2004 | Owens et al. |
| 2005/0114848 | A1 | 5/2005 | Choi et al. |
| 2009/0172652 | A1 | 7/2009 | Simon et al. |
| 2010/0153675 | A1 | 6/2010 | Kumar |
| 2011/0085623 | A1 | 4/2011 | Khayrallah |
| 2012/0054725 | A1 | 3/2012 | Inglis et al. |
| 2012/0124106 | A1 | 5/2012 | Allen |
| 2012/0216276 | A1 | 8/2012 | Regnault |

OTHER PUBLICATIONS

De Verdiere et al., "Speedup Prediction for Selective Compilation of Embedded Java Programs", Embedded Software. Second International Conference, EMSOFT 2002, Proceedings (Lecture Notes in Computer Science vol. 2491) Springer-Verlag Berlin, Germany, 2002, pp. 227-239, XP002618859.

French Search Report and Written Opinion dated Jan. 27, 2011 for corresponding French Application No. 1055261, filed Jun. 29, 2010.

International Preliminary Report on Patentability and English translation of Written Opinion dated Jan. 8, 2013 for corresponding International Application No. PCT/EP2011/060748, filed Jun. 27, 2011.

Stefan Brahler, Analysis of the Android Architecture, 2010.

SELECTIVE COMPILING METHOD, DEVICE, AND CORRESPONDING COMPUTER PROGRAM PRODUCT

CROSS-REFERENCE TO RELATED APPLICATIONS

This Application is a continuation of U.S. application Ser. No. 13/807,398, filed on Aug. 7, 2013, which is a Section 371 National Stage Application of International Application No. PCT/EP2011/060748, filed on Jun. 27, 2011 and published as WO 2012/000949 on Jan. 5, 2012, the entire contents of each of which is incorporated herein by reference.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the field of the compilation of software programs or applications.

The present disclosure pertains more particularly to the compilation of software programs or applications in heterogeneous environments.

A computer program, or a software application, generally consists of a set of binary or intermediate instructions known as executable instructions. These executable instructions are usually derived from a compilation of a program written in a source language. Thus, to be able to create a software application, a developer draws up a source program written in a specific programming language. This source program is then compiled in order to form an executable program. During this compilation, the instructions written in source language are converted into a binary program which is itself executed on a software platform such as a computer or a communications terminal.

To compile a program written in a source language for a certain target (processor, platform, etc.) there are four general methods:
- having a complete compiler, i.e. a compiler having one part in charge of recognizing the source language and another part in charge of creating the code for the chosen target;
- having a compiler of the source language into an intermediate code and providing a virtual machine with this intermediate code on the chosen target. This is the case for the Java™ language for example;
- providing a compiler that already exists for the chosen target with a complementary module to recognize the source language;
- having a compiler that converts a program written in a source language into a program in an intermediate language and implementing an existing compiler of the intermediate language for the chosen target.

BACKGROUND OF THE DISCLOSURE

Figure 1:
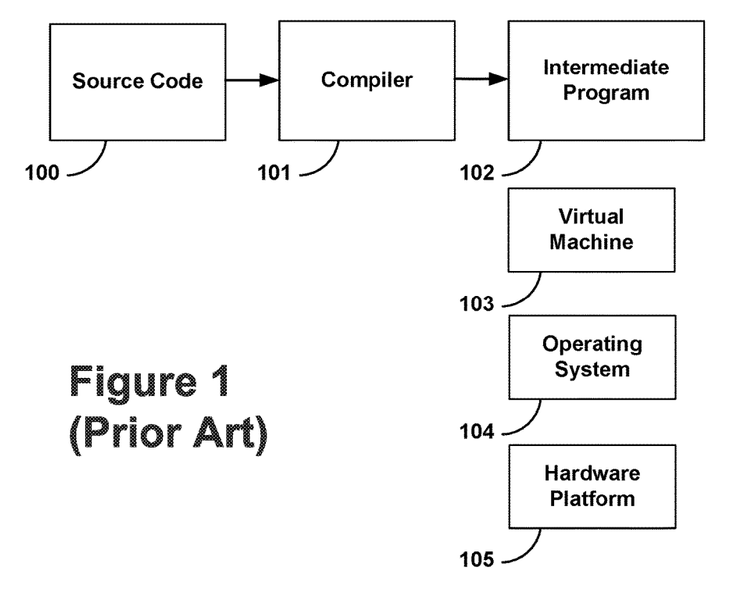
FIG. 1, already commented upon, presents the general principle of the compilation of a code into an intermediate code in order to execute it in a virtual machine.

If we consider the case where the application is compiled from the source language into an intermediate code, and where this intermediate code is executed by a virtual machine on the chosen target, which is generally the case with the language Java™, there is a problem of a performance level of the execution of the application. FIG. 1 describes the general principle of a code execution technique based on a virtual machine. The source code 100 is compiled into an intermediate code 102 by means of the compiler 101. Then, this code is executed on a virtual machine 103, which is itself executed on the operating system 104, itself executed on a hardware platform 105. Since the intermediate code should be able to get executed on any platform whatsoever that has a virtual machine adapted to the intermediate code, this intermediate code is not optimized.

In a context of optimizing the performance of the intermediate code, two general optimizing techniques can be distinguished in the prior art.

In the first technique, a compilation of the intermediate code is done dynamically. This is called dynamic compilation. To this end, the virtual machine comprises a compiler capable of dynamically compiling portions of intermediate code into binary mode and also comprises a mechanism to dynamically execute the binary code generated by this compiler instead of the original intermediate code. Thus, the execution of the application consists of a mixture of intermediate code and dynamically generated binary code.

Two major types of embodiments of dynamic compilation can be distinguished: the "just-in-time" (JIT) type and the "dynamic adaptive compiler" (DAC) type.

The "just-in-time" compiler generally has compilation granularity at the method level (it can compile only entire methods). It carries out the compilation in binary code of the method to be executed during the first execution of the method. The dynamic adaptive compiler (DAC) implements another strategy. It executes the application on the virtual machine and dynamically determines the parts of the code penalizing the performance of the application. These parts are called hot spots of the application. Each DAC has its own hot-point detection strategy. These hot spots are constituted, for example, by the most frequently executed methods or the methods comprising loops or the methods taking the greatest amount of time to be executed. Once this identification is done, it compiles the hot spots into binary code. Then, the virtual machine executes the binary code version of the hot spots.

Figure 2:
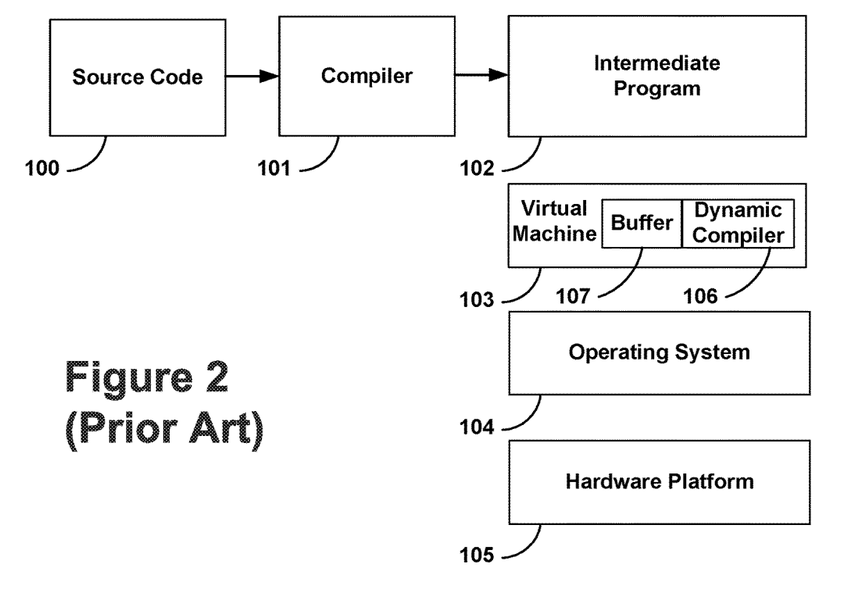
FIG. 2, already commented upon, presents the general principle of the dynamic compilation of a software application that gets executed in a virtual machine.

Referring to FIG. 2, we present the general principle of the compilation and execution of an application by means of a virtual machine in combining a dynamic compiler in order to accelerate the execution of the application.

A source software application (100) is drafted by an application developer. This source program comprises computer program instructions written in a source programming language. The source program (100) undergoes a first phase of compilation by a compiler (101) which leads to its conversion into an intermediate program (102). This intermediate program (102) is executed by a virtual machine (103) which gets executed above an operating system (104) in binary mode, that relies on a hardware platform (105). This virtual machine (103) is coupled to a dynamic compiler (106) which automatically determines and dynamically compiles portions of intermediate code into binary code within a binary code temporary memory location or buffer (107). The virtual machine (103) also has means for executing a binary version of an intermediate code, if it exists, in order to improve the performance of the application.

The use of a dynamic compiler however has two problems. First of all, a dynamic compiler takes time to get executed in addition to the application, both for determining hot spots and during the compilation of the intermediate code into binary code. Indeed, to identify the hot spots, an instrumentation of the interpreter of the virtual machine is generally done in order to monitor the behavior of the application. These steps of instrumentation consequently entail penalties for the performance of the application. As for the compilers, in order to limit their compilation time, the optimization done by them is simple and cannot be aggressive. This will limit the performance of the binary code generated relatively to the compiler which gets executed upstream to the execution. Then, these solutions use buffer memory to store the binary codes generated. In the majority of cases, this code is stored in a limited memory zone and the compiler must therefore make choices continuously in order to determine those binary codes that are the right ones to be kept in this buffer. This causes a problem of performance of these dynamic compilers when they manage numerous applications or when the size of this memory zone is small.

Thus, the dynamic compilers, although they generate binary code, cannot be used to achieve high levels of performance. Furthermore, the greater the importance of the intermediate code (as is the case on an Android™ application where the system service applications and the programming interfaces are executed in intermediate code), the more difficult it is to detect the hot spot, and the greater the extent to which the code buffer management is called into play, thus limiting the performance of the system correspondingly.

The second technique for optimizing the performance of the intermediate code consists in making the virtual machine faster on the chosen target. This optimizing can be done by optimizing the virtual machine for which it exploits the capacities of the processor that uses it to the greatest possible extent. It can also be done through an additional specific hardware support. It can also be done by designing a specific algorithm to raise the performance of the virtual machine on the target.

Apart from these two solutions, there remains the possibility of using an offline compiler which compiles the totality of the source code or the intermediate code into binary code upstream to the execution of the application. This approach makes it possible to avoid penalizing the execution of the application as a result of the time taken up by the dynamic compiler, and also enables the performance of highly optimized compilations of the application. This approach has the advantage of procuring high performance levels for the applications. This approach however dictates the complete compilation of an application and uses the operating system to control the execution of the application. In environments where the virtual machine is the execution core of the system, as is the case for the Android™ system, this makes it unusable because this solution is not planned for integration into a virtual machine. Besides, since the size of the binary code generated is greater than the size of the interpreted code, the size of the application becomes great and involves the use of more memory.

SUMMARY

An exemplary embodiment of the invention pertains to a method for compiling a software application that is to be executed within a virtual machine of a hardware platform, said software application originally taking the form of a set of codes to be compiled.

According to an embodiment of the invention, a method of this kind comprises a phase of selective compilation of said set of codes to be compiled delivering a compiled application comprising a first application part executed by said virtual machine in using instructions of said virtual machine, and a second application part comprising binary instructions directly executable on said hardware platform.

Thus, an embodiment of the invention optimizes the performance of the applications by achieving, through a same set of codes, an application constituted by an application part executed by said virtual machine and an application part executed directly by the hardware platform, without using the interpreter of the virtual machine. The set of codes to be compiled consists of files which will be written in a unique language.

According to one particular embodiment, said set of codes to be compiled is a set of intermediate codes and said method comprises a first phase for compiling a set of source codes and delivering said set of intermediate codes used during said phase of selective compilation.

Thus, an embodiment of the invention directly optimizes an intermediate code which has already undergone a first compilation, to optimize the execution of this intermediate code.

According to one particular embodiment, said set of codes to be compiled is a set of source codes written in a programming language.

According to one particular characteristic, said phase of selective compilation comprises:
  a first step for selecting, from said set of codes to be compiled, a first subset of codes to be compiled;
  a step for compiling said first subset of codes to be compiled delivering said first application part.

According to one particular characteristic, said phase for selective compiling further comprises:
  a second step for selecting, from said set of codes to be compiled, a second subset of codes to be compiled complementary to said first subset selected preliminarily;
  a step for compiling said second subset of codes to be compiled delivering a third subset of source codes to be compiled;
  a step for compiling said third subset of source codes to be compiled delivering said second application part.

According to one particular characteristic, said method further comprises, during said step for compiling said second subset of source codes to be compiled, a step for introducing at least one structure for interfacing said second application part with said virtual machine.

This data structure can for example be a JNI (Java Native Interface) type interface. According to another approach, this interfacing structure can be a particular structure enabling a link to be set up with a higher-performance internal interface of the virtual machine.

According to one particular characteristic, said set of codes to be compiled is a Java "bytecode" set.

According to one particular characteristic, said set of codes to be compiled is a Dalvik "bytecode" set.

According to one particular characteristic, said set of codes to be compiled is a set of Java codes.

According to one particular embodiment, said method is implemented prior to an execution of said software application within said virtual machine.

According to another aspect, an embodiment of the invention also pertains to a device for compiling a software application that is to be executed within a virtual machine of a hardware platform, said software application originally taking the form of a set of codes to be compiled. According to an embodiment of the invention, a device of this kind comprises means of selective compilation of said set of codes to be compiled delivering a compiled application comprising a first application part executed by said virtual machine in using instructions of said virtual machine and a second application part comprising binary instructions directly executable on said hardware platform.

According to another aspect, an embodiment of the invention also pertains to a computer program product comprising program code instructions for implementing the method of navigation as described here above, when this program is executed by a computer.

An embodiment of the invention provides a novel and inventive solution to these problems of the prior art. Indeed, an embodiment of the invention proposes a method for automatic and selective compiling of a code written in a source or intermediate programming language in order to generate a binary code of the selected parts capable of being executed by a virtual machine.

This virtual machine could complementarily execute a dynamic compiler which will take charge of compiling the intermediate code remaining to be executed.

Thus, an embodiment of the invention relies on a wholly novel and inventive approach to the compilation of software applications for environments working on the basis of virtual machines. In being partial and selective, an embodiment of the invention enables the developer to choose precisely what he wishes to compile in order to retain control of the offline use of the compilation. An embodiment of the invention also makes it possible to combine the offline compilation approaches and the dynamic compilation approaches with a view to providing better execution performance.

BRIEF DESCRIPTION OF THE DRAWINGS

Other features and advantages shall appear more clearly from the following description of an embodiment, given by way of a simple illustratory and non-exhaustive example, and from the appended drawings, of which.

DETAILED DESCRIPTION OF ILLUSTRATIVE EMBODIMENTS

1. Reminder of the Principle of an Embodiment of the Invention

The general principle of an embodiment of the invention lies in the combination of a static approach to compilation, enabling the creation of optimized computer applications in carrying out a compilation (prior to the execution of the application) while at the same time preserving an execution based on the implementation of virtual machines. As already mentioned, one of the problems related to applications working on virtual machines is that of performance. Indeed, the principle on which the use of virtual machines is based is that enabling the portability of intermediate code (derived from one or more source-code compilations) on to any hardware platform having a virtual machine capable of executing the intermediate code in question.

Now, this universality of the intermediate code implies making an interpretation of the intermediate code by means of instructions understood by the processor, and this lowers performance in the execution of this code. Thus, it is generally recognized that binary codes offer performance levels that are appreciably higher than those of intermediate codes, these performance levels resulting chiefly from the fact that the binary code is executed directly by the processor of the hardware platform in using all the instructions of the processor and without needing any complementary interpretation.

An embodiment of the invention also pertains to a technique of compilation for execution environments based on virtual machines that provides better execution performance.

The principle of improvement of performance relies on the shifting of the execution of certain parts of the intermediate code into the form of binary code which performs appreciably better, while at the same time maintaining the control of execution of the application by the target virtual machine.

The compilation is based on the source (or intermediate) code of the application. During the compilation, the compiler generates code comprising two parts: a first intermediate code set which is executed in implementing the virtual machine, and a second binary code set which is executed directly by the processor of the hardware platform.

Figure 3:
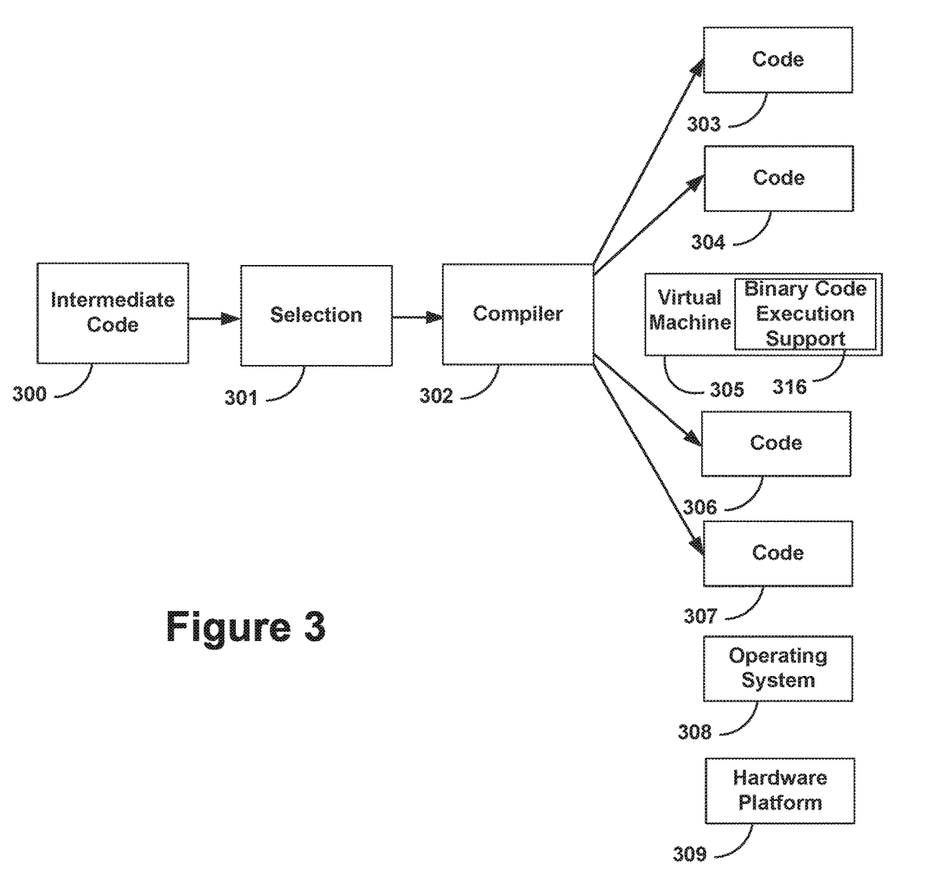
FIG. 3 describes the principle of an embodiment of the invention.

FIG. 3 describes the principle of an embodiment of the invention.

An embodiment of the invention enables the developer to select (301), from a source code or an intermediate code 300, those parts of the codes that are to be compiled into binary code. The compiler 302 generates the codes (303, 304, 306 and 307) enabling the portions of codes chosen by the developer to be executed in binary code. The codes generated (303, 304, 306 and 307) will get executed by the virtual machine 305 through its binary code execution support 316. The virtual machine gets executed on the operating system 308, which itself is executed on a hardware platform 309.

Thus, an embodiment of the invention enables the developer to choose the pieces of source codes that have to be executed with high performance, without any additional manual integrating operation.

The selection of the source (and/or intermediate) to be compiled in binary mode:
is done as a function of the developer's choices. There is therefore no longer any detection of hot spots by the virtual machine for this selected source code
this selection makes it possible to bring into effect the compromise between generated expansion and memory and therefore to optimize the memory size needed. This is particularly valuable depending on the types of virtual machines used, as shall be described here below;
enables the acceleration of the application codes or system services;
enables the acceleration of the libraries of the virtual machine.

At the level of the integration based on the binary code execution support of the virtual machine:
The integration with the virtual machine is transparent. There is no modification of the virtual machine.
The performance of the final code depends on the binary code execution support of the virtual machine.

The integration is compatible with a solution of dynamic compilation of a virtual machine. This integration enables the performance values to be added up together.

The binary code enables dynamic loading or embedding according to the possibilities of the virtual machine.

This type of integration offers the possibility of proceeding by successive compilations to obtain the result (intermediate code optimizer, dedicated binary compiler).

An embodiment of the invention also makes it possible to have different compilation granularities relating to method, application, service, APIs or end of code. The fact of having different compilation granularities makes it possible to target the code parts to be accelerated with precision as the case may be.

The compilation method of an embodiment of the invention is implemented upstream to the execution of the application on the platform. Since there are no resource constraints, the compiler can thus use highly intensive aggressive optimization to generate the binary code or intermediate code which will further improve the performance of the application.

It is also possible to use a scheme of successive compilations in order to generate intermediate and binary codes likely to be executed. Thus, the compiler will generate source codes that will be compiled by third-party compilers and then generate the intermediate codes and the binary codes. As a result, the generated codes will benefit from the accumulation of the optimization operations carried out by the compilers.

According to one particular embodiment, in order to enable its execution by the target virtual machine, a set of specific codes, binding the two sets (intermediate and binary) together, is integrated with the two sets of codes generated by using a native interface of the virtual machine. The use of a native interface has a positive impact on the degree of improvement in performance obtained (depending on the interface used).

According to one particular embodiment, in order to maximize the performance of the application, the compiler uses one of the native interfaces available to the virtual machine. Thus, this native interface could be either the standard interface of the virtual machine enabling a link to be made with native libraries (for example a JNI interface) or one of the higher-performance internal interfaces. Thus, it is not necessary to provide for a set of specific codes to link the set of intermediate codes and the set of binary codes.

According to one particular characteristic, the dependency between the binary application part and the virtual machine lies in a native interface of this virtual machine. Sometimes, this native interface does not need to be modified. Sometimes it has to be modified in order to obtain the desired improvement in performance.

In this embodiment, since the method of compilation relies on one of the native interfaces of the virtual machine, it makes it possible to preserve the system that is the object of the target virtual machine, without having to modify it.

Thus, for example, during the compilation for obtaining all the binary codes, it is provided that a set of instructions will be introduced into this set, enabling access to the system that is the object of the virtual machine. This set of instructions, called a set of referencing instructions, makes it possible, during the execution of the application, to create a structure for interfacing the binary application part (which corresponds to the set of binary codes) with the virtual machine. More particularly, this interfacing structure, in one particular embodiment, comprises one or more global variables of the binary application part. A global variable comprises a pointer which points towards an address (in memory) for access to objects or data structures managed by the virtual machine for the application. Thus, in this embodiment, there is only one set of objects or data structures common both to the set of intermediate codes and to the set of binary codes.

In another example, during the compilation for obtaining the set of binary codes, another set of referencing instructions is introduced into this set, making it possible, during the execution of the application, to create an interfacing structure with a table for referencing the objects used by the binary application part. This table for referencing objects forms part of the data managed by the application part. Indeed, during the execution of the application, since the objects are shared between the virtual machine and the binary application part, it is necessary that the virtual machine should know the objects that are used by the binary application part to prevent the garbage collector of the virtual machine from eliminating the objects used by the binary application part. It is therefore necessary that the virtual machine should be able to obtain knowledge of the objects used by the binary application part within the memory space allocated to the application part. The adding of referencing structures during the generation of the sets of codes permits the virtual machine to make sure that it does not eliminate objects used by the binary part.

In another embodiment, to further improve performance, it is also possible to use a second object system enabling the execution of the binary code without any need to use the native interface of the virtual machine.

Ultimately, according to one particular embodiment, almost all of an application can be compiled in binary code in using its own object system. In this particular embodiment, the set of intermediate codes generated is minimal and enables the virtual machine to carry out the minimum operations needed to execute the application, such as launching, terminating or suspending execution of the application at the terminal.

However, whatever the embodiment, the basic driving unit of the execution of the application is still the virtual machine.

The basis of the method, consisting in compiling a set of source or intermediate codes as two sets of codes (intermediate and binary), is automatic. The entire procedure can be completely automatic, or may comprise complementary manual phases.

Generally, the binary code occupies a greater place in the memory than the intermediate code. Indeed, the intermediate code is designed to take account of constraints on memory size in the terminal. Thus, during the use of an embodiment of the invention, when an intermediate code is compiled in binary code, there is an increase in the size of the code of the application. In order to control the compromise between improvement of performance and size of the binary code generated, the method makes it possible, in at least one embodiment, to select the parts of codes to be compiled. Thus, the developer of the application achieves full control over code expansion in the light of the memory constraints of the target terminal.

In one alternative embodiment, the compiler can also of his own decide on the cutting of the codes to be performed in using a particular optimization by which a compromise between memory expansion and performance can be obtained automatically.

The method is compatible with an interpreted target virtual machine. This virtual machine can also have available a dynamic compiler which will take charge of improving the performance of the intermediate code. Thus, improvements in performance are cumulated (initially with the method of an embodiment of the invention and dynamically with the dynamic compiler).

The method is not restricted to applications and can be used for source code or intermediate code of the application, service or library that is to be executed by the virtual machine.

According to one particular embodiment, the method can be used on all the sets of codes of an application or a particular portion of a code without any limit of granularity (a class, a method or a piece of code of a method).

Here below, we shall describe an implementation of an embodiment of the invention adapted to the Android™ platform. It is clear that the invention is in no way restricted to this particular platform but can also be implemented in the context of other platforms.

2. Description of One Embodiment

In this embodiment, we present the implementation for an Android™ execution environment.

The Android™ execution environment of Google's™ is based on a distribution of the Linux™ operating system to which there are added libraries, a virtual machine named Dalvik™ and intermediate code. This intermediate code comprises applications, system services and libraries embedded in the platform. The source codes of the applications, services and libraries are written in Java™, then compiled in Dalvik™. The particular nature of Android™ is that it is adapted to the working of light terminals which have low execution capacities compared with currently used personal computers. The Dalvik™ virtual machine has the particular feature of having a register-based virtual machine architecture unlike other virtual machines which are stack-based virtual machines.

As a rule, stack-based virtual machines must use instructions to load data on to the stack and handle data and therefore require more instructions than register-based machines to implement code of a same level but the instructions in a register-based machine have to encode the source and destination registers and therefore tend to be more bulky.

The Android™ compilation string for the Java language compiles Java code into intermediate code using two compilers. The first compiles the Java source code into Java intermediate code (Java bytecode). The second compiles the Java intermediate code (Java bytecode) into Dalvik intermediate code (.dex file). We therefore have a string of two successive compilations to arrive at an executable code ".dex" on an Android™ platform using a source code written in Java.

On the Android™ platforms, to improve performance, an embodiment of the invention is implemented as follows:
  the initial Java source code CSj is compiled by means of the Java compiler of the Android™ platform in order to produce a first intermediate code set (Java bytecode) CIj, which in this embodiment is the code to be compiled.
  then, the intermediate code CIj is compiled selectively to obtain two distinct sets of codes: a first source code set C/C++ CSc1 and a second intermediate code set CIj2.
  more specifically, the second set of intermediate codes CIj2 is compiled into Dalvik™ intermediate code by means of the compiler available in the Android™ compilation string in order to produce the "dex" application executable on the platform by means of the Dalvik™ virtual machine.
  The first source code set CSc1, comprising C/C++ code, is compiled by means of the C/C++ compiler available in the Android™ compilation string in order to generate therefrom binary code which takes the form of Linux™ dynamic libraries in order to produce the second part of the application.

The Dalvik™ virtual machine comprises several native interfaces, of which one interface, the JNI (Java Native Interface), is a development framework that enables the Java bytecode, which is executed within a Java virtual machine, to call (and be called) by applications or libraries known as native applications or libraries executed in binary code.

This JNI interface is widely used in Java environments. Thus, in order to link the execution of both types of codes generated (on the one hand the Dalvik™ code and on the other hand the Linux™ dynamic libraries), the compiler of the invention adds specific JNI codes enabling both parts to be executed.

Thus, an embodiment of the invention enables the Java parts to be compiled in native code while at the same time keeping intermediate code parts, all of it being done in linking the execution of the two parts of the application by means of the JNI interface of Dalvik™.

Another implementation of the invention can also consist in using the internal native interface of the Dalvik™ virtual machine to prevent the use of the JNI interface which itself may raise some problems of performance.

Naturally, as already explained, the Dalvik™ virtual machine remains in full control of the execution and its object execution model is still kept and is used to execute the application. This object execution model is in charge of managing the fields, methods, and associated memory.

From an execution point of view, an embodiment of the invention makes it possible to benefit from a high-performance binary code which is executed within the virtual machine.

Another advantage is the ability to make good use of the properties of the memory architecture of the hardware platform. Each processor of the hardware platform has an associated memory architecture. This architecture may be formed by several levels of cache memory, specific memory (direct access memory, ROM, etc.), additional memory, namely random-access memory or flash memory, various clocking frequencies, etc.

Apart from its basic performance for executing a binary instruction, the performance of the processor will depend on the location of the instructions and data of an application in its memory hierarchy. Generally, the processor provides for two access channels for accessing memory in parallel, one for instructions, and the other for data. These two channels are besides optimized and calibrated according to the distribution of the instruction and data accesses.

With regard to the virtual machines, the intermediate code is considered to be a piece of data. Thus, all the memory accesses pass by the same channel, and this entails penalties for the working of the memory architecture and has an impact on execution performance.

The dynamic compilers generate binary code which can be loaded by the instruction channel. Thus, they enable both memory access channels to be used in parallel. However, this binary code is in a random-access memory preventing the use of read-only memory which is resident in proximity to the processor.

In one particular implementation of the invention, since the compiler can be executed upstream to the integration of the terminal, the binary code can be placed in a read-only memory close to the processor. This makes it possible to:

- take advantage of the performance of the read-only memory in order to make the application perform even better;
- derive benefit from the energy performance of the read-only memories enabling the autonomy of the platform to be increased;
- limit the use of random-access memory in inserting only additional data or code into it;
- take advantage of the use of the different instruction and data memory access channels.

Ultimately, the overall performance of the system is improved.

3. Other Optional Features and Advantages

In at least one embodiment, the invention takes the form of a device capable of implementing the method for compiling as described here above. Such a device is schematically described with reference to FIG. 4.

Figure 4:
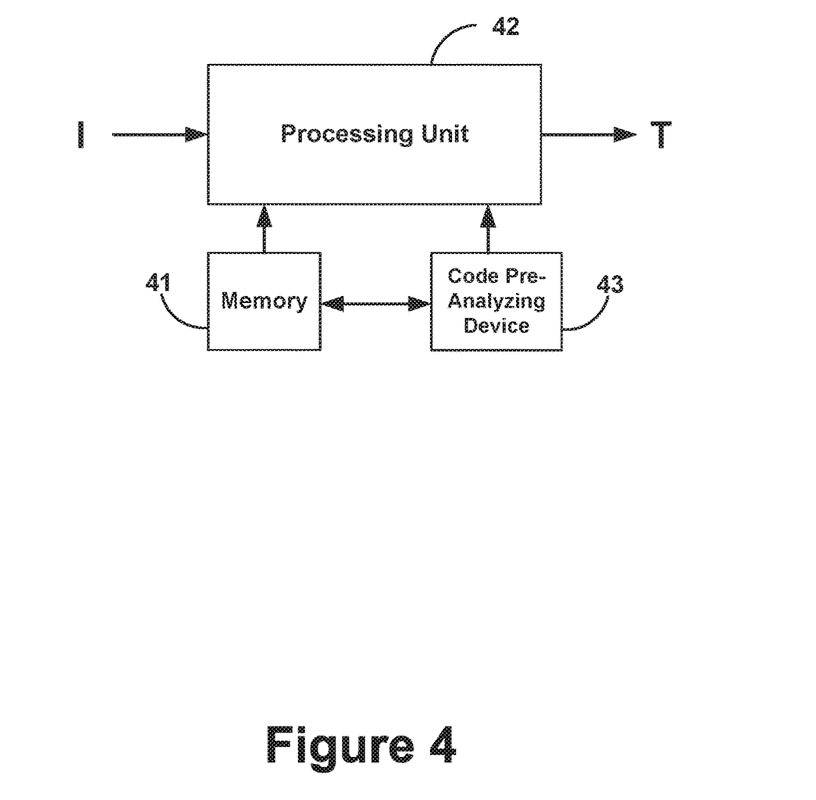
FIG. 4 is a schematic drawing showing the principle of a compilation device according to an embodiment of the invention.

It comprises a memory 41 and a processing unit 42 which is equipped with a microprocessor driven by a computer program (or application). The processing unit 42 inputs, via an input interfacing module I, a set of codes to be compiled, which the microprocessor processes according to the instructions of the above-mentioned computer program to generate an application formed by two parts. This two-part application is delivered by means of the interface T.

To obtain this two-part application, the device comprises means of selective compilation of the set of codes to be compiled, delivered a compiled application comprising a first application part executed by said virtual machine in using instructions of said virtual machine and a second application part comprising binary instructions directly executable on said hardware platform.

The means of selective compilation comprise means for selecting subsets of codes to be compiled. These means for selecting are implemented manually or implemented automatically. An automatic implementation of the selecting can be done by a code pre-analyzing device 43 aimed at identifying the code portions for which an optimization and/or a binary execution is preferable.

The selective compilation means further comprise at least two compilation devices which make it possible, on the one hand, to generate the first part of the application which is generated by the virtual machine and, on the other hand, to generate the second part of the application which is executed by the operating system of the hardware platform. These two compilation devices can be complemented by other devices such as other compilers, link editors or optimizers.

Although the present disclosure has been described with reference to one or more examples, workers skilled in the art will recognize that changes may be made in form and detail without departing from the scope of the disclosure and/or the appended claims.

What is claimed:

1. A method for compiling a software application for execution via a virtual machine of a hardware platform, the method comprising:
   identifying a predetermined portion of a software code for the software application; and
   prior to execution of the software application, compiling the predetermined portion of the software code to generate a software application part comprising binary instructions for execution on the hardware platform,
   wherein the compiling comprises incorporating a set of reference instructions enabling the software application part to manage a table for referencing one or more objects used by the software application part, and
   wherein during execution of the software application:
   (i) the virtual machine allocates a memory space to the software application part, (ii) the software application part uses the allocated memory space to store the table and the one or more objects, (iii) the virtual machine accesses the table to determine the one or more objects being used by the software application part within the allocated memory space, and (iv) a garbage collector of the virtual machine removes the determined one or more objects from the allocated memory space.

2. The method of claim 1, wherein during execution of the software application, the set of reference instructions enables the virtual machine to access the table managed by the software application part.

3. The method of claim 1, wherein during execution of the software application, the garbage collector of the virtual machine removes the determined one or more objects from the allocated memory space after receiving an indication from the software application part to delete the one or more objects.

4. The method of claim 1, further comprising:
   storing, prior to execution of the software application, the binary instructions of the software application part in a first memory of the hardware platform,
   wherein during execution of the software application, the virtual machine allocates the memory space for storing the one or more objects and the table within a second memory of the hardware platform different from the first memory.

5. The method of claim 4, wherein the first memory is a read-only memory (ROM).

6. The method of claim 5, wherein the hardware platform comprises a processor having at least two access channels for accessing memory, the at least two access channels including a first access channel and a second access channel,
   wherein the first memory is accessible to the processor via the first access channel, and
   wherein the second memory is accessible to the processor via the second access channel.

7. The method of claim 6, wherein during execution of the software application:
   the virtual machine causes the processor to access the binary instructions of the software application part via the first access channel for execution of the software application part, and
   the virtual machine causes the processor to access platform independent intermediate code associated with another software application part of the software application via the second access channel for execution of the other software application part.

8. The method of claim 1, wherein the predetermined portion of the software code is a predetermined first portion of the software code, wherein the software application part is a first software application part, the method further comprising:
   identifying a predetermined second portion of the software code different than the predetermined first portion of the software code; and
   prior to execution of the software application, compiling the predetermined second portion of the software code to generate a second software application part comprising platform independent intermediate code, wherein during execution of the software application, the virtual machine interprets the platform independent intermediate code to enable execution of the second software application part on the hardware platform.

9. The method of claim 8, wherein the one or more objects are one or more first objects, and wherein during execution of the software application, the virtual machine manages one or more second objects for the second software application part.

10. The method of claim 9, wherein compiling the predetermined first portion of the software code of the first software application part further comprises incorporating another set of reference instructions enabling the first software application part to access the one or more second objects managed by the virtual machine.

11. The method of claim 10, wherein the other set of reference instructions includes one or more global variables that correspond to the one or more second objects, wherein each global variable enables access to a portion of a memory that stores one of the one or more second objects managed by the virtual machine.

12. The method of claim 1, further comprising:
providing an interface enabling the virtual machine to control execution of the software application part.

13. The method of claim 1, wherein the software code is a result of a previous compilation of code.

14. The method of claim 1, wherein the software code is source code.

15. The method of claim 1, wherein the predetermined portion of the software code is based on a granularity, wherein the granularity defines a minimum size of a portion of software code, wherein the granularity of the predetermined portion of the software code is a portion of code for a given method, wherein the portion of code for the given method includes some, but not all, code for the given method.

16. A computer system operable for compiling a software application for execution via a virtual machine of a hardware platform, the system comprising:
one or more processors; and
data storage storing instructions executable by the one or more processors to cause the system to perform operations comprising:
identifying a predetermined portion of a software code for the software application; and
prior to execution of the software application, compiling the predetermined portion of the software code to generate a software application part comprising binary instructions for execution on the hardware platform,
wherein the compiling comprises incorporating a set of reference instructions enabling the software application part to manage a table for referencing one or more objects used by the software application part, and wherein
during execution of the software application: (i) the virtual machine allocates a memory space to the software application part, (ii) the software application part uses the allocated memory space to store the table and the one or more objects, (iii) the virtual machine accesses the table to determine the one or more objects being used by the software application part within the allocated memory space, and (iv) a garbage collector of the virtual machine removes the determined one or more objects from the allocated memory space.

17. The system of claim 16, wherein the operations further comprise:
storing, prior to execution of the software application, the binary instructions of the software application part in a first memory of the hardware platform,
wherein during execution of the software application, the virtual machine allocates the memory space for storing the one or more objects and the table within a second memory of the hardware platform different from the first memory.

18. The system of claim 17, wherein the first memory is a read-only memory (ROM).

19. A non-transitory computer readable medium storing instructions that, when executed by one or more processors of a computing system operable for compiling a software application for execution via a virtual machine of a hardware platform, cause the computing system to perform operations comprising:
identifying a predetermined portion of a software code for the software application; and
prior to execution of the software application, compiling the predetermined portion of the software code to generate a software application part comprising binary instructions for execution on the hardware platform,
wherein the compiling comprises incorporating a set of reference instructions enabling the software application part to manage a table for referencing one or more objects used by the software application part, and wherein during execution of the software application:
(i) the virtual machine allocates a memory space to the software application part, (ii) the software application part uses the allocated memory space to store the table and the one or more objects, (iii) the virtual machine accesses the table to determine the one or more objects being used by the software application part within the allocated memory space, and (iv) a garbage collector of the virtual machine removes the determined one or more objects from the allocated memory space.

20. The computer readable medium of claim 19, wherein the predetermined portion of the software code is a predetermined first portion of the software code, wherein the software application part is a first software application part, and wherein the operations further comprise:
identifying a predetermined second portion of the software code different than the predetermined first portion of the software code; and
prior to execution of the software application, compiling the predetermined second portion of the software code to generate a second software application part comprising platform independent intermediate code,
wherein during execution of the software application, the virtual machine interprets the platform independent intermediate code to enable execution of the second software application part on the hardware platform.

* * * * *